US010135618B2

(12) United States Patent
Pham

(10) Patent No.: US 10,135,618 B2
(45) Date of Patent: Nov. 20, 2018

(54) METHOD FOR USING DYNAMIC PUBLIC KEY INFRASTRUCTURE TO SEND AND RECEIVE ENCRYPTED MESSAGES BETWEEN SOFTWARE APPLICATIONS

(71) Applicants: Synergex Group, Greenwich, CT (US); Wayne Taylor, Chandler, AZ (US); Pham Holdings, Inc., Lacey, WA (US)

(72) Inventor: Thien Van Pham, Lacey, WA (US)

(73) Assignees: Synergex Group (corp.), Greenwich, CT (US); Pham Holdings, Inc. (corp.), Lacey, WA (US); Wayne Taylor, Chandler, AZ (US)

( * ) Notice: Subject to any disclaimer, the term of this patent is extended or adjusted under 35 U.S.C. 154(b) by 72 days.

(21) Appl. No.: 15/081,447

(22) Filed: Mar. 25, 2016

(65) Prior Publication Data

US 2017/0279608 A1     Sep. 28, 2017

(51) Int. Cl.

| H04L 29/06 | (2006.01) |
|---|---|
| H04L 9/32 | (2006.01) |
| G06F 9/54 | (2006.01) |
| H04L 9/00 | (2006.01) |
| H04L 9/08 | (2006.01) |
| H04L 9/14 | (2006.01) |
| H04L 9/30 | (2006.01) |
| H04W 12/06 | (2009.01) |
| H04W 12/08 | (2009.01) |
| H04W 12/12 | (2009.01) |

(52) U.S. Cl.
CPC ............... *H04L 9/32* (2013.01); *G06F 9/546* (2013.01); *H04L 9/006* (2013.01); *H04L 9/0861* (2013.01); *H04L 9/0891* (2013.01); *H04L 9/14* (2013.01); *H04L 9/30* (2013.01); *H04L 63/061* (2013.01); *H04L 63/08* (2013.01); *H04L 63/101* (2013.01); *H04L 63/1441* (2013.01); *H04W 12/06* (2013.01); *H04W 12/08* (2013.01); *H04W 12/12* (2013.01)

(58) Field of Classification Search
CPC ......... H04L 9/32; H04L 9/006; H04L 9/0861; H04L 9/14; H04L 9/30; H04L 63/1441; H04L 9/0891; H04L 63/061; H04L 63/08; H04L 63/101; G06F 9/546; H04W 12/06; H04W 12/08; H04W 12/12
See application file for complete search history.

(56) References Cited

U.S. PATENT DOCUMENTS

| 7,415,571 | B1 * | 8/2008 | Hanan | ................... G06F 21/80 711/112 |
|---|---|---|---|---|
| 2003/0065941 | A1 | 4/2003 | Ballard et al. | |
| 2005/0257057 | A1 * | 11/2005 | Ivanov | ................. G06Q 20/383 713/171 |

(Continued)

FOREIGN PATENT DOCUMENTS

WO   WO 2002/021793   3/2002

OTHER PUBLICATIONS

International Search Report and Written Opinion dated Jun. 22, 2017 in International Patent Application No. PCT/US2017/024084.

(Continued)

*Primary Examiner* — Sarah Su
(74) *Attorney, Agent, or Firm* — Byrne Poh LLP

(57) ABSTRACT

Method for using dynamic Public Key Infrastructure to send and receive encrypted messages between software applications.

6 Claims, 1 Drawing Sheet

(56) References Cited

U.S. PATENT DOCUMENTS

| | | |
|---|---|---|
| 2006/0200660 A1 | 9/2006 | Woods |
| 2007/0299915 A1 | 12/2007 | Sharim et al. |
| 2008/0028464 A1 | 1/2008 | Bringle et al. |
| 2008/0240440 A1 | 10/2008 | Rose et al. |
| 2010/0174791 A1* | 7/2010 | Tian .................. H04L 51/04 709/206 |
| 2010/0195824 A1 | 8/2010 | Lin et al. |
| 2011/0205965 A1* | 8/2011 | Sprigg ................ G06F 9/4411 370/328 |
| 2013/0103807 A1* | 4/2013 | Couto ................ H04W 12/06 709/220 |
| 2014/0219447 A1* | 8/2014 | Park .................... H04W 12/08 380/247 |
| 2016/0154982 A1* | 6/2016 | Velusamy .............. H04L 63/20 455/411 |
| 2017/0180118 A1* | 6/2017 | Bernheim .............. H04L 9/083 |
| 2017/0188231 A1* | 6/2017 | Nix ...................... H04W 12/04 |
| 2017/0279602 A1* | 9/2017 | Pham .................... H04L 9/006 |
| 2017/0279608 A1* | 9/2017 | Pham ...................... H04L 9/32 |

OTHER PUBLICATIONS

International Preliminary Report on Patentability dated Oct. 4, 2018 in International Application No. PCT/US2017/024084.
Office Action dated Oct. 5, 2018 in U.S. Appl. No. 15/469,119.

* cited by examiner

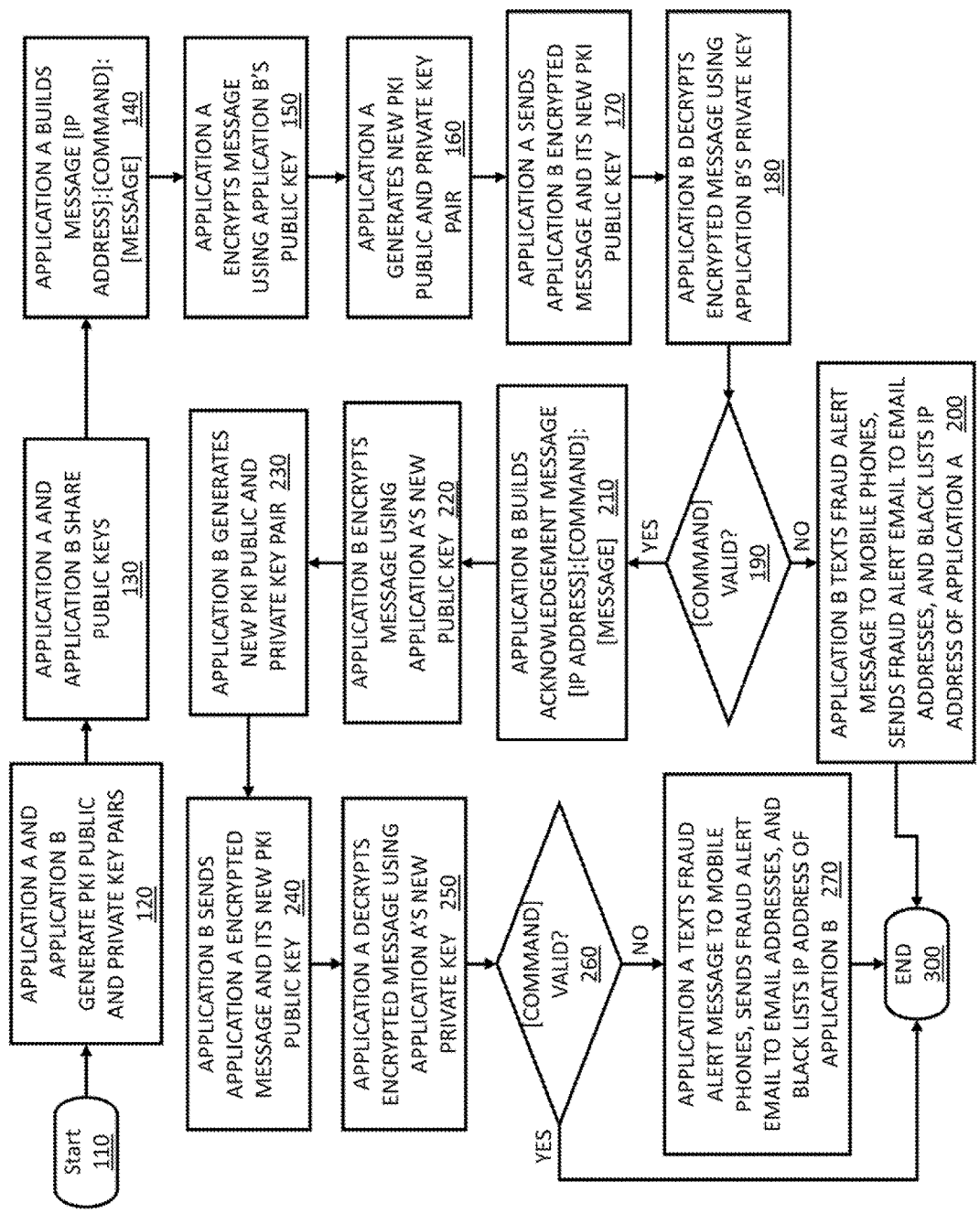

METHOD FOR USING DYNAMIC PUBLIC KEY INFRASTRUCTURE TO SEND AND RECEIVE ENCRYPTED MESSAGES BETWEEN SOFTWARE APPLICATIONS

CROSS-REFERENCE TO RELATED APPLICATIONS

Not Applicable.

STATEMENT REGARDING FEDERALLY SPONSORED RESEARCH AND DEVELOPMENT

Not Applicable

REFERENCE TO SEQUENCE LISTING, A TABLE, OR A COMPUTER PROGRAM LISTING COMPACT DISC APPENDIX

Not Applicable

FIELD OF THE INVENTION

The present invention relates generally to software applications communicating by encrypting messages using dynamic Public Key Infrastructure (PKI). More specifically, the present invention relates to generating private and public keys, sharing the public keys between the software applications, using the public keys to encrypt messages, sending the encrypted messages between the software applications, validating the authenticity of the encrypted messages, texting fraud alerts to smart phones if the authenticity of the encrypted messages has been compromised, emailing fraud alerts to email addresses if the authenticity of the encrypted messages has been compromised, and black listing the IP Address of the software application that sent an invalid message.

BACKGROUND OF THE INVENTION

Data communications between software applications are not as secure as they should be. Many software applications communicate by symmetric key encryption using a single key that is shared. There are other software applications that use asymmetric encryption using Public Key Infrastructure (PKI) by using public and private keys. If the private key is compromised, the communication link is not secure and the person or software snooping on the communication link can read all the messages communicated.

Using symmetric encryption with a shared key and asymmetric encryption with PKI public and private keys are not enough to prevent the communication link between software applications from hackers. What is needed is a method of using dynamic PKI where every message sent between applications are encrypted with a new set of public and private key pair that are dynamically generated and to text a fraud alert message to mobile phones, send fraud alert email to email addresses and black list the IP Address of the application if the communication link has been compromised.

BRIEF SUMMARY OF THE INVENTION

In a typical application, two software applications, Application A and Application B, would like to send and receive messages such as text or binary data. Application A and B generate their own PKI public and private key pairs. To initiate the communication link between Application A and Application B, Application A sends its public key to Application B. Application B then sends its public key to Application A. Now application A and B have each other's public keys and the communication can begin.

Application A wants to send a message to Application B. First, Application A builds the message using the following format:

[IP Address]:[Command]:[Message]

[IP Address] represents the IP Address of the application. [Command] represents a text that both Application A and Application B know in advance. [Message] represents any text or binary data. Once Application A builds the message according to the format [IP Address]:[Command]:[Message], Application A uses Application B's public key to encrypt the message using an asymmetric encryption algorithm. Application A then generates a new PKI public and private key pair. Application A then sends the encrypted message and its new PKI public key to Application B. When Application B receives the encrypted message from Application A and Application A's new PKI public key, Application B uses its PKI private key to decrypt the encrypted message using an asymmetric decryption algorithm. If the [Command] is readable and represents one of the known [Command] by Application B, the message is authentic and it has not been compromised. Application B then sends Application A an acknowledgement message that it has successfully received the encrypted message by first building the message according to the format:

[IP Address]:[Command]:[Message]

Next, Application B uses the received Application A's new PKI public key to encrypt the acknowledgement message using an asymmetric encryption algorithm. Application B then generates a new public and private key pair. Application B then sends the encrypted acknowledgment message and its new PKI public key to Application A.

If Application B does not understand [Command], Application B texts a fraud alert message to mobile phones specified by the creator of the Application B, sends a fraud alert message to email addresses specified by the creator of the Application B, and black lists the IP Address of Application A and prevents Application A from further communication.

When Application A receives the acknowledgement message and Application B's new PKI public key, Application A uses its new PKI private key to decrypt the encrypted acknowledgement message using an asymmetric decryption algorithm. If the [Command] is readable and represents one of the known [Command] by Application A, the message is authentic and it has not been compromised. If Application A does not understand [Command], Application A texts a fraud alert message to mobile phones specified by the creator of Application A, sends a fraud alert message to email addresses specified by the creator of the Application A, and black lists the IP Address of Application B and prevents Application B from further communication.

This process continues until Application A or Application B terminates the communication link.

BRIEF DESCRIPTION OF THE SEVERAL VIEWS OF THE DRAWING

FIG. 1 illustrates the process of the present invention.

DETAILED DESCRIPTIONS OF THE INVENTION

The invention is now described in detail with reference to an embodiment thereof as illustrated in the accompanying drawing. In the following description, numerous specific details are set forth in order to provide thorough understanding of the present disclosure. It is apparent, however, to one skilled in the art, that the present disclosure may be practiced without some or all of these specific details. In other instances, well known process steps and/or structures have not been described in detail in order not to unnecessarily obscure the present disclosure. In addition, while the disclosure is described in conjunction with the particular embodiment, it should be understood that this description is not intended to limit the disclosure to the described embodiment. To the contrary, the description is intended to cover alternatives, modifications, and equivalents as may be included within the spirit and scope of the disclosure as defined by the appended claims.

FIG. 1 illustrates the process of the present invention for sending and receiving secured messages between software applications by first generating PKI public and private keys, sharing public keys, building a message, encrypting the message, generating new PKI public and private keys, sending the message and the new PKI public key, validating the message, sending fraud alerts, black listing IP Addresses, sending acknowledgement message and validating authenticity of acknowledgement message.

First the program starts at Step 110. The program then continues to Step 120 where Application A and Application B generates PKI public and private key pairs and continues to Step 130. At Step 130, Application A sends Application B its PKI public key. Application B sends Application A its PKI public key.

Once PKI public keys are shared between Application A and Application B, a communication link is established between Application A and Application B. Application A wants to send Application B a message by first building the message at Step 140 of the format:

[IP Address]:[Command]:[Message]

[IP Address] represents the IP Address of the application. [Command] represents a text that both Application A and Application B know in advance. [Message] represents any text or binary data. After building the message at Step 140, the program continues to Step 150.

At Step 150, Application A uses Application B's public key that was generated at Step 120 to encrypt the message using an asymmetric encryption algorithm and continues to Step 160. At Step 160, Application A generates a new PKI public and private key pair and continues to Step 170. At Step 170, Application A sends the encrypted message and its new PKI public key to Application B and continues to Step 180. At Step 180, Application B receives the encrypted message from Application A and Application A's new PKI public key, Application B uses its private key generated at Step 120 to decrypt the encrypted message using an asymmetric decryption algorithm and continues to Step 190. At Step 190, If the [Command] is readable and represents one of the known [Command] by Application B, the message is authentic and it has not been compromised and the program continues to Step 210. At Step 210, Application B builds the acknowledgment message according to the format:

[IP Address]:[Command]:[Message]

[IP Address] represents the IP Address of the application. [Command] represents a text that both Application A and Application B know in advance. [Message] represents any text or binary data. After building the acknowledgement message, the program continues to Step 220. At Step 220, Application B uses the received Application A's new PKI public key that was generated at Step 160 to encrypt the acknowledgement message using an asymmetric encryption algorithm and continues to Step 230. At Step 230, Application B generates a new public and private key pair and continues to Step 240. At Step 240, Application B sends the encrypted message and its new PKI public key to Application A.

At Step 190, if Application B does not understand [Command], the program continues to Step 200 where Application B texts a fraud alert message to mobile phones specified by the creator of the Application B, sends a fraud alert message to email addresses specified by the creator of the Application B, and black lists the IP Address of Application A and prevents Application A from further communication and continues to Step 300 where the program ends.

When Application A receives the acknowledgement message and Application B's new PKI public key that was sent to Application A at Step 240, the program continues to Step 250. At Step 250, Application A uses its new PKI private key that was generated at Step 160 to decrypt the encrypted acknowledgement message using an asymmetric decryption algorithm and continues to Step 260. If the [Command] is readable and represents one of the known [Command] by Application A, the message is authentic and it has not been compromised and the program continues to Step 300 where the program ends. At Step 260, if Application A does not understand [Command], the program continues to Step 270 where Application A texts a fraud alert message to mobile phones specified by the creator of Application A, sends a fraud alert message to email addresses specified by the creator of the Application A, and black lists the IP Address of Application B and prevents Application B from further communication and continues to Step 300 where the program ends.

What is claimed is:

1. A method for using dynamic Public Key Infrastructure to send and receive encrypted messages between software applications comprising:

(a) generating a sender's PKI public and private key pair for a sender application and a receiver's PKI public and private key pair for a receiver application, wherein the sender's PKI public and private key pair comprises a sender's public key and a sender's private key and wherein the receiver's PKI public and private key pair comprises a receiver's public key and a receiver's private key, and sharing the sender's public key with the receiver application and the receiver's public key with the sender application;

(b) building a first message with a format of

[IP Address]:[Command]:[Message];

(c) encrypting the first message with the recipient's PKI receiver's public key to produce an encrypted first message;

(d) generating a new sender's PKI public and private key pair, wherein the new sender's PKI public and private key pair comprises a new sender's public key and a new sender's private key;

(e) sending the encrypted first message and the new sender's public key to the receiver application;

(f) decrypting the encrypted first message using the receiver's private key to produce a decrypted first message having a [Command];

(g) validating the [Command] of the decrypted first message to determine if the [Command] of the decrypted first message is a valid [Command] that is known in advance;

(h) if the [Command] of the decrypted first message is determined to not be a valid [Command], black listing an IP address of the sender application, sending a first fraud alert message to a first mobile phone, and sending a first fraud alert email to a first email address;

(i) if the [Command] of the decrypted first message is determined to be a valid [Command], building an acknowledgement message with a format of
[IP Address]:[Command]:[Message];

(j) encrypting the acknowledgement message with the new sender's public key to produce an encrypted acknowledgment message;

(k) generating a new receiver's PKI public and private key pair, wherein the new receiver's PKI public and private key pair comprises a new receiver's public key and a new receiver's private key;

(l) sending the encrypted acknowledgment message and the new receiver's public key to the sender application;

(m) decrypting the encrypted acknowledgment message using the new sender's private key to produce a decrypted acknowledgment message having a [Command];

(n) validating the [Command] of the decrypted acknowledgment message to determine if it is a valid [Command] that is known in advance; and (o) if the [Command] of the decrypted acknowledgment message is determined to not be a valid [Command], black listing an IP address of the receiver application, sending a second fraud alert message to a second mobile phone, and sending a second fraud alert email to a second email address.

2. The method of claim 1, wherein in the format of the first message, [Command] is text, and [Message] is text or binary data.

3. The method of claim 1, wherein in the format of the acknowledgment message, [Command] is text and [Message] is text or binary data.

4. The method of claim 1, wherein the first fraud alert message is sent to the first mobile phone if the [Command] of the decrypted first message is an unknown [Command].

5. The method of claim 1, wherein the first fraud alert email is sent to the first email address if the [Command] of the decrypted first message is an unknown [Command].

6. The method of claim 1, wherein the IP Address of the sender application is black listed if the [Command] of the decrypted first message is an unknown [Command].

* * * * *

UNITED STATES PATENT AND TRADEMARK OFFICE
CERTIFICATE OF CORRECTION

PATENT NO. : 10,135,618 B2  
APPLICATION NO. : 15/081447  
DATED : November 20, 2018  
INVENTOR(S) : Thien Van Pham Page 1 of 1

It is certified that error appears in the above-identified patent and that said Letters Patent is hereby corrected as shown below:

In the Claims

Claim 1, Line 49, "encrypting the first message with the recipient's PKI receiver's" should be --encrypting the first message with the receiver's--.

Signed and Sealed this  
Eighth Day of January, 2019

Andrei Iancu  
*Director of the United States Patent and Trademark Office*